(No Model.)
S. B. JENKINS.
ELECTRIC SOLDERING IRON.
No. 497,793. Patented May 23, 1893.
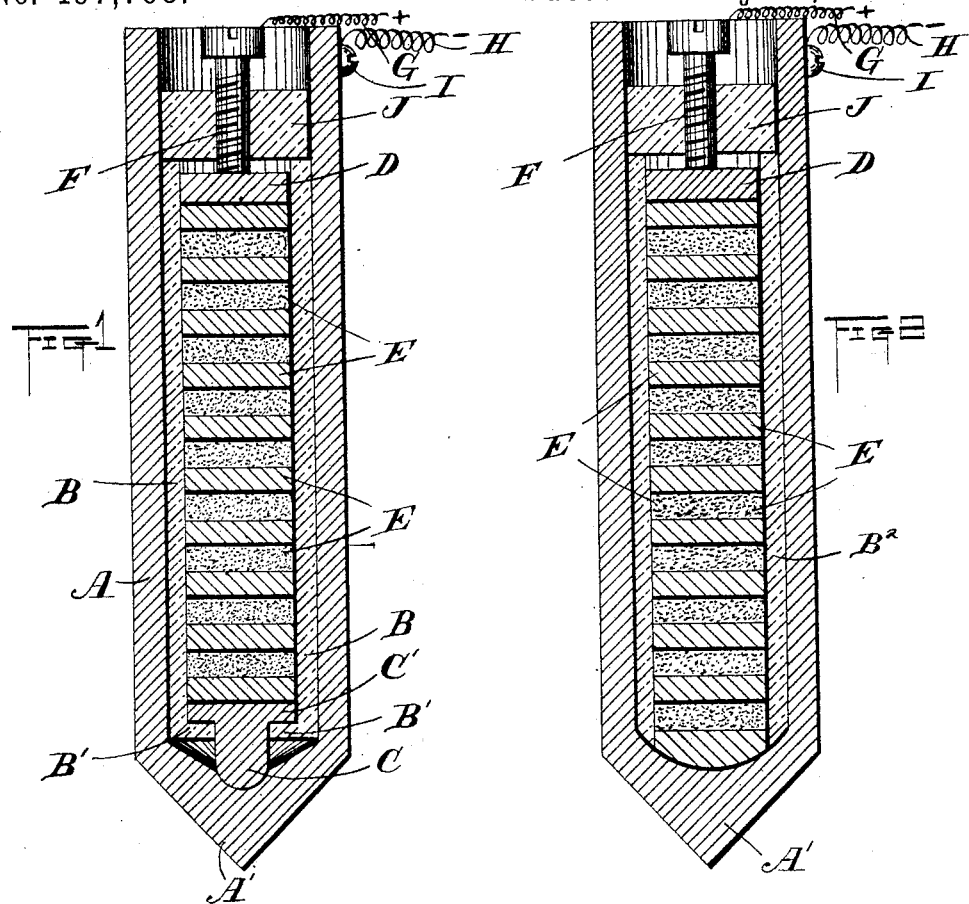
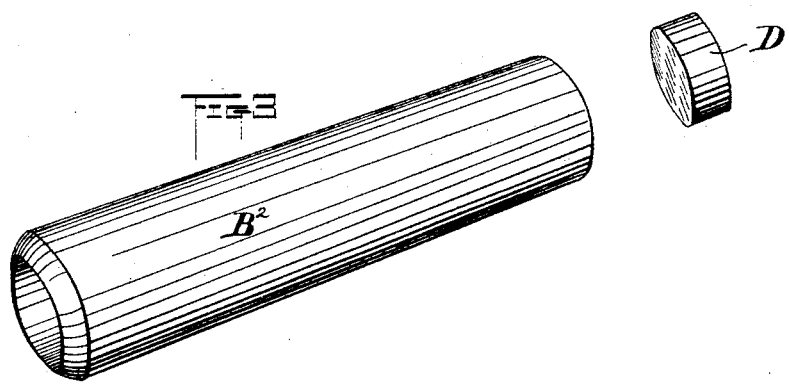
WITNESSES
INVENTOR
Samuel B. Jenkins
by Wm H Balcock
Attorney

UNITED STATES PATENT OFFICE.

SAMUEL B. JENKINS, OF BOSTON, MASSACHUSETTS, ASSIGNOR TO THE AMERICAN ELECTRIC HEATING COMPANY, OF SAME PLACE.

ELECTRIC SOLDERING-IRON.

SPECIFICATION forming part of Letters Patent No. 497,793, dated May 23, 1893.

Application filed December 5, 1892. Serial No. 454,131. (No model.)

*To all whom it may concern:*

Be it known that I, SAMUEL B. JENKINS, a citizen of the United States, residing at Boston, in the county of Suffolk and State of Massachusetts, have invented certain new and useful Improvements in Electric Soldering-Irons; and I do hereby declare the following to be a full, clear, and exact description of the invention, such as will enable others skilled in the art to which it appertains to make and use the same.

This invention relates to soldering irons heated by electricity, the current passing through a resistance contained within the hollow iron and the heat being created at the contact with the point thereof. For such purposes I employ preferably a heater constructed as hereinafter described. The construction and arrangement of the disks, their containing shell and the terminal plates may, however, be considerably varied.

In the accompanying drawings Figure 1 represents a vertical longitudinal section through a soldering iron embodying my invention. Fig. 2 represents a similar view of another form of soldering iron also embodying the same; Fig. 3 represents a detail perspective view of the terminal contact plate and pile-inclosing tube used in Fig. 2.

A designates the hollow body of the soldering iron terminating in a soldering-point A'. Within this as shown in Fig. 1 is a tube B of baked clay, porcelain, stone or other suitable insulating and refractory material having at its lower end an internal annular shoulder or flange B', the latter supporting the head C' of a metallic contact-plug C which protrudes from said tube far enough to come into contact with the interior of the point A' when the said tube and contents are placed within the soldering iron body. Another contact block or plug D is inserted in the upper end of the said tube. Between these plugs and within the said tube, I make a resistance pile of disks or plates E which may be of graphite and metal arranged alternately as indicated on the drawings (which construction is preferred) or of either alone or of any other material or materials possessing proper electrical conductivity and resistance. These disks may also be coated with heterogeneous incombustible resisting material as in the said application. The passage of the electric current from plate to plate will generate heat at each alternate place of such contact, besides the heat generated in traversing the material itself; and this excess of heat will be increased by the heterogeneity of the material and its alternately increasing and decreasing resistance. The upper end of the soldering iron body A is filled with slate or other insulating block J, through which a screw F passes to make contact with the upper contact plug D of the resistance. A wire G runs from this screw and another wire H runs from a screw I turned into the upper part of the said body. These wires are in an electric circuit. The passage of the current through the pile of resistance disks develops heat, which is communicated by the lower contact plug C to the soldering point A'.

In the construction shown in Fig. 3 an insulating tube B² is used having no internal flange, no lower contact plug C and a lower end of equal diameter with the upper end. The lowest of the disks or plates E is rounded on its lower face to fit approximately the inner face of the soldering iron. The block J, screws F I and wires G H are substantially the same as those before described.

For the soldering-iron body A any suitable material such as iron, brass or other metal which is a good conductor of heat may of course be employed.

Having thus described my invention, what I claim as new, and desire to secure by Letters Patent, is—

1. A soldering iron having within its body a pile of disks or plates of resisting but conducting material, in combination with electric connections making circuit through the said pile and the point of the said iron substantially as set forth.

2. In combination with a hollow soldering-iron body, a tube or shell within the same, a pile of disks or plates of resisting but conducting material within the said tube, and electric connections making circuit through the said pile and the point of the said soldering iron substantially as set forth.

3. A hollow soldering-iron body, in combination with an insulating plug or block closing the upper end of the same a conductor extending through the said block, circuit wires connected to the said conductor and body, an insulating tube within the said body a pile of conducting yet resisting disks or plates within the said tube and a contact piece making connection between the upper end of the said pile and the said conductor, the heat created in the said pile passing to the soldering point for the purpose set forth.

4. A hollow soldering-iron body, in combination with an inclosed insulating tube open at both ends a pile of resisting yet conducting plates or disks within the said tube yet in contact with the inner face of the soldering point and electrical connections to said body and to the upper end of the said pile whereby the electric current is caused to pass through the said pile and the said point substantially as set forth.

5. A soldering iron having within its body a pile of disks or plates of resisting but conducting material, the said disks or plates alternating in the degrees of their resistance, in combination with electric connections making circuit through the said pile and the point of the said iron substantially as set forth.

In testimony whereof I affix my signature in presence of two witnesses.

SAMUEL B. JENKINS.

Witnesses:
EDWIN W. PIERCE,
PELATIAH R. TRIPP.